United States Patent [19]
Takei et al.

[11] Patent Number: 5,469,030
[45] Date of Patent: Nov. 21, 1995

[54] DIRECT CURRENT MOTOR DRIVE APPARATUS

[75] Inventors: Seiji Takei; Kouji Obara, both of Kanagawa, Japan

[73] Assignee: Nippon Thompson Co., Ltd., Tokyo, Japan

[21] Appl. No.: 117,615

[22] Filed: Sep. 8, 1993

[30] Foreign Application Priority Data

Sep. 10, 1992 [JP] Japan .................................. 4-268067

[51] Int. Cl.$^6$ .................................................. H02K 23/00
[52] U.S. Cl. .......................... 318/254; 318/138; 318/439; 318/135
[58] Field of Search ........................ 318/135, 254, 318/678, 687, 439, 560, 811, 129, 132, 520, 555

[56] References Cited

U.S. PATENT DOCUMENTS

| | | | |
|---|---|---|---|
| 3,619,749 | 11/1971 | Schieman | 318/254 |
| 3,716,769 | 2/1973 | Brunner | 318/520 |
| 4,409,526 | 10/1983 | Yamauchi et al. | 318/254 |
| 4,686,437 | 8/1987 | Langley et al. | 318/254 |
| 4,922,160 | 5/1990 | Ogawa | 318/135 |
| 5,162,709 | 11/1992 | Ohi | 318/254 |
| 5,270,631 | 12/1993 | Takahashi et al. | 318/135 |

Primary Examiner—William M. Shoop, Jr.
Assistant Examiner—Karen Masih
Attorney, Agent, or Firm—Sughrue, Mion, Zinn, Macpeak & Seas; Richard C. Turner; Joseph J. Buczynski

[57] ABSTRACT

A direct current motor drive apparatus generating low levels of heat is described. A pulse width modulation signal, generated by a pulse width modulator corresponding to a torque command signal, is applied to a Hall effect element. The Hall effect element then generates an output corresponding to the number of lines of magnetic force of a field magnet on the moving side. After this output is amplified by an operational amplifier, waveform shaping is performed by first and second comparators. The resulting signals are then amplified by first and second power amplifiers and supplied to excitation coils.

Since waveform shaping is performed on the signal applied to each of the power amplifiers mentioned above, the power amplifiers operate in a region of roughly complete switching, thereby suppressing the generation of heat.

8 Claims, 7 Drawing Sheets

DIRECT CURRENT MOTOR DRIVE APPARATUS

BACKGROUND OF THE INVENTION

1. Field of the Invention

The present invention relates to a direct current motor drive apparatus, and for example, to a drive apparatus of a direct current linear motor.

2. Description of the Related Art

Direct current linear motors are frequently used to move an object to be moved with high accuracy in a linear motion mechanism such as a machine tool or industrial robot. This type of linear motor is composed of a primary side and a secondary side, wherein, for example, the primary side serves as the power supply side and the stationary side, while the secondary side serves as the moving side.

The power supply side that composes the primary side is equipped with an excitation coil and a drive circuit and so forth for supplying drive current to this excitation coil. In addition, a field magnet is mounted on the moving side that composes the secondary side. The moving side, or secondary side, is moved with respect to the primary side by the thrust produced between the primary side and the secondary side based on Fleming's right-hand rule as a result of current being supplied to the above-mentioned excitation coil.

FIG. 1 shows the constitution of a drive circuit for supplying drive current to the excitation coil mentioned above. In FIG. 1, 1 is an input terminal to which a torque command signal of $\pm V_T$ is supplied. The torque command signal of $\pm V_T$ is supplied to absolute value circuit 2 from input terminal 1. The absolute value output of the torque command signal generated by this absolute value circuit 2 is applied to pulse width modulator 3 where it is converted into a pulse width modulation signal. The pulse width modulation signal from pulse width modulator 3 is then supplied to direction changer 4.

Direction changer 4 changes the output polarity of the pulse width modulation signal produced by pulse width modulator 3 according to a signal from polarity distinction circuit 5. The torque command signal of $\pm V_T$ applied to input terminal 1 is then supplied to this polarity distinction circuit 5. Thus, with respect to the output signal produced by direction changer 4, the output polarity of the pulse width modulation signal is changed according to the polarity of the torque command signal applied to input terminal 1.

The pulse width modulation signal from the above-mentioned direction changer 4 is respectively supplied to the controlled input terminals of Hall effect elements 6a through 6c. The Hall effect output terminals of each Hall effect element 6a through 6c are connected to respective power amplifiers 7a through 7c. The outputs of each Hall effect element 6a through 6c are respectively amplified by these power amplifiers 7a through 7c, and then supplied to each excitation coil 8a through 8c connected to each of the output terminals of power amplifiers 7a through 7c.

Here, each of the above-mentioned Hall effect elements 6a through 6c is arranged so as to correspond to a field magnet (not shown) that composes the moving side. Thus, a pulse width modulation signal corresponding to a torque command signal is output to each power amplifier 7a through 7c only when the field magnet of the moving side approaches. Thus, output from each power amplifier 7a through 7c is supplied, in order, to each excitation coil 8a through 8c. As a result, thrust is applied to the field magnet based on Fleming's right-hand rule, and this thrust acts by moving the moving side, or secondary side, with respect to the stationary primary side with the torque corresponding to the torque command signal.

However, according to the drive apparatus of the prior art described above, the current amplified by each power amplifier 7a through 7c corresponds to pulse width intermittently. However, since the pulse width modulation signal supplied to each power amplifier 7a through 7c is produced by each Hall effect element 6a through 6c, the output of each of these Hall effect elements 6a through 6c is controlled according to the number of lines of magnetic force produced by the field magnet that composes the moving side.

The number of lines of magnetic force that act on each Hall effect element 6a through 6c is inversely proportional to the square of the distance between the field magnet and Hall effect elements. Thus, output characteristics are produced such that, as shown in FIG. 2, the output from each Hall effect element 6a through 6c rises linearly between time (I) and time (II), crest value (h) remains constant during a prescribed time t from time (II) to time (III), and then output falls linearly between time (III) and time As a result, the operation of each power amplifier 7a through 7c is in the region of roughly complete switching during a prescribed time t from time (II) to time (III). Thus, collector loss of a power transistor that composes power amplifiers 7a through 7c does not occur to a large extent. However, in linear region (V) from time (I) to time (II) as well as linear region (VI) from time (III) to time (IV), each power amplifier 7a through 7c is not operating in the form of a complete switching operation, thus resulting in an increase in collector loss of the power transistor composing power amplifiers 7a through 7c.

Thus, this collector loss results in generation of heat by each power amplifier 7a through 7c thereby resulting in the shortcoming of reduced reliability of the drive circuit.

SUMMARY OF THE INVENTION

In consideration of the above-mentioned shortcoming of the prior art, the object of the present invention is to provide a highly reliable direct current motor drive apparatus that suppresses the generation of heat from each power amplifier in the drive circuit.

The present invention is comprised of: a pulse modulation device that modulates a torque command signal into a corresponding pulse; an electromagnetic conversion device to which a pulse signal from said pulse modulation device is applied; a comparison device that receives the output of said electromagnetic conversion device and shapes the waveform of the output signal from the electromagnetic conversion device; and, a power amplification device that amplifies the output of said comparison device to supply that amplified output to an excitation coil.

DESCRIPTION OF THE PREFERRED EMBODIMENTS

Although the following provides a description of the direct current motor drive apparatus claimed in the present invention based on its embodiments with reference to the drawings, an explanation is first provided of one example of a direct current linear motor that is driven by the drive apparatus of the present invention with reference to FIGS. 3 through 6.

The direct current linear motor shown in FIGS. 3 through 6 is composed of a primary side and a secondary side. In this example, the primary side is designated as the power supply side and stationary side, while the secondary side is designated as the moving side. An explanation will first be provided regarding the guide device that mutually guides these primary and secondary sides.

Figure 3:
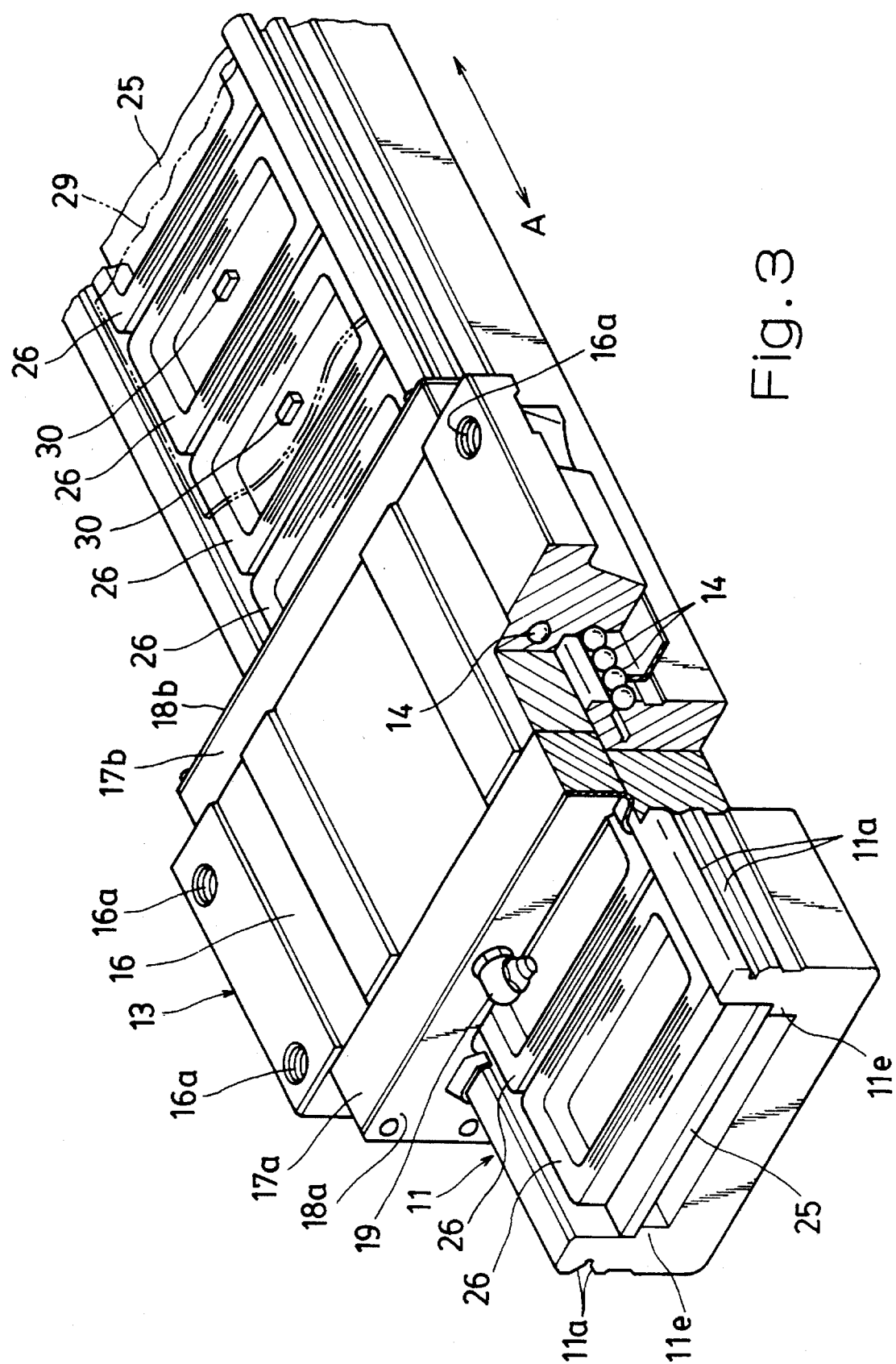
FIG. 3 is a perspective view, with a portion cut away, showing the constitution of the direct current linear motor embodied by the present invention.
Figure 4:
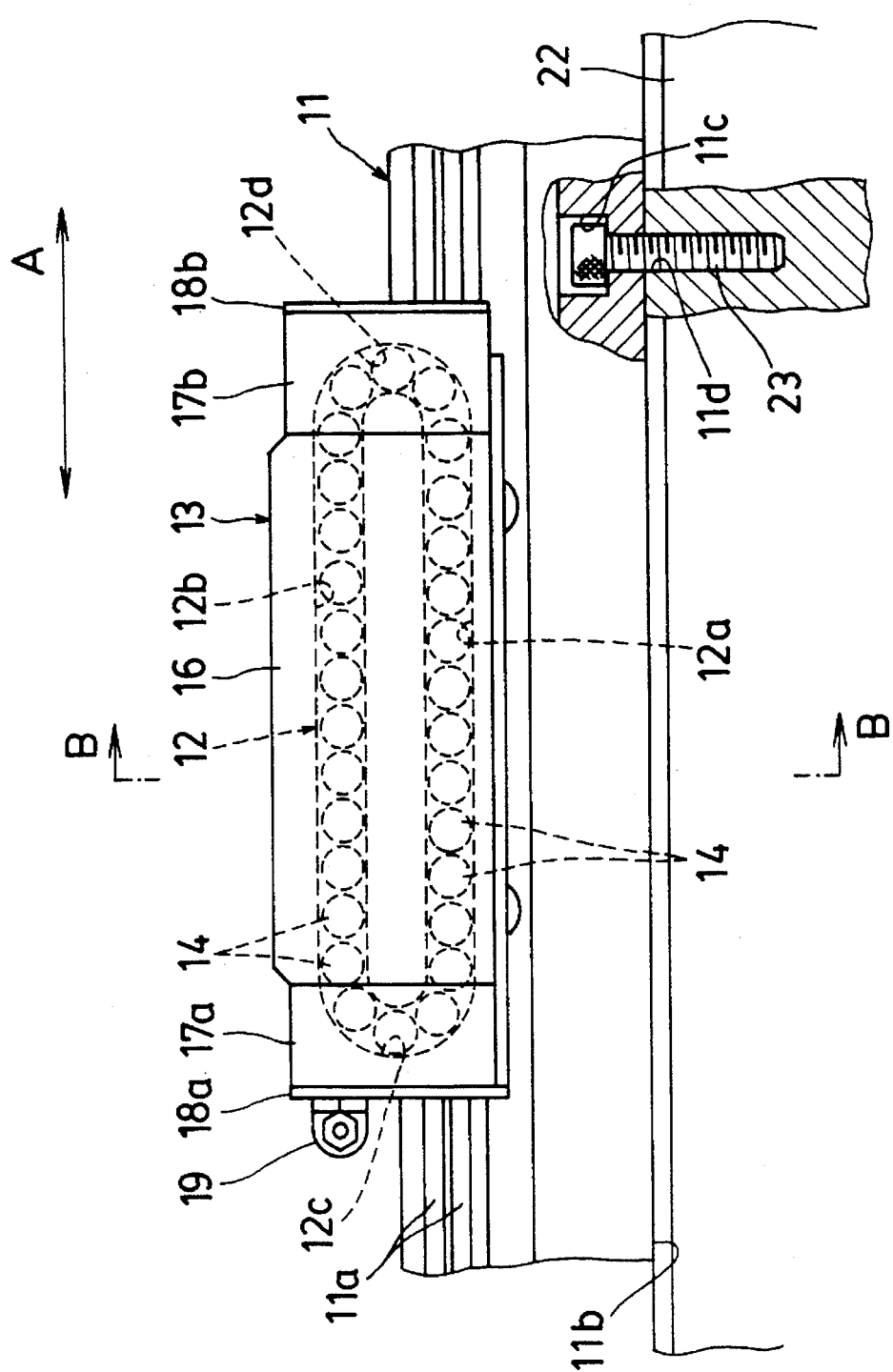
FIG. 4 is a side view, with a portion cut away, showing the linear motor shown in FIG. 3 mounted on the bed of a machine tool.
Figure 5:
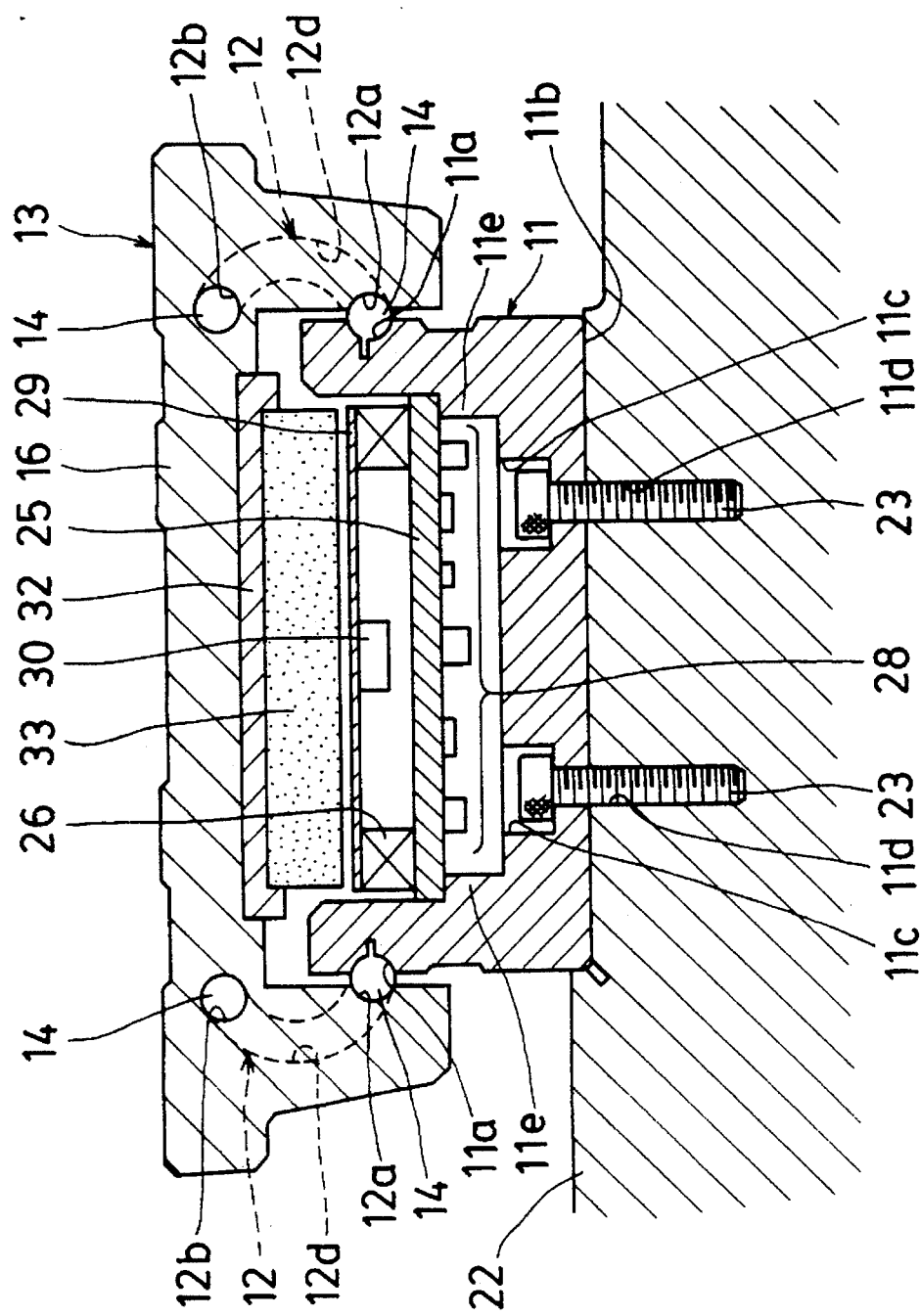
FIG. 5 is a cross-sectional view showing the cross-section taken along arrows B—B in FIG. 4.
Figure 6:
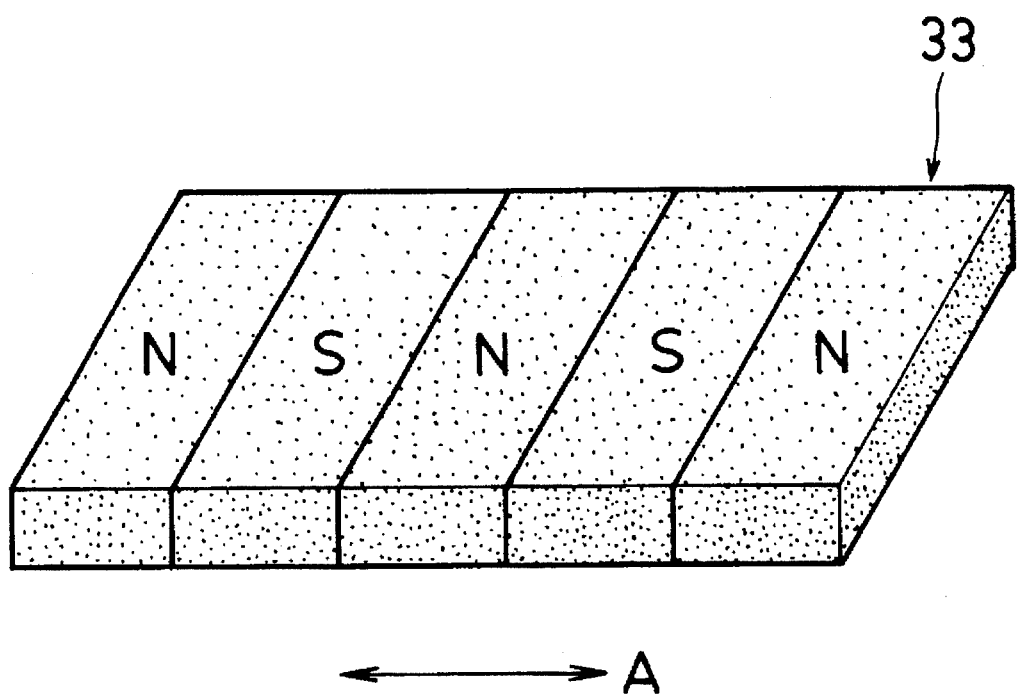
FIG. 6 is a perspective view of the field magnet equipped on the linear motor shown in FIGS. 3 through 5.

As shown in FIGS. 3 through 5, this guide device has track rail 11, formed to have a roughly U-shaped cross-section opening upwards perpendicular to the direction of its elongation, rolling element circulating path 12 (reference numerals shown in FIGS. 4 and 5, to be later described in detail), and sliding unit 13 in the form of a slider able to move relative with respect to said track rail 11. One each of track grooves 11a, in the form of tracks having a roughly circular cross-section, are formed along the axial direction in the right and left outside portions of track rail 11. Two of said rolling element circulating paths 12 are provided to correspond to each of these track grooves 11a. A plurality of rolling elements in the form of balls 14 are arranged and housed within said rolling element circulating path 12 that bear the load between track rail 11 and sliding unit 13 by circulating while rolling over this track groove 11a accompanying movement of sliding unit 13.

This sliding unit 13 has casing 16 straddled over track rail 11, a pair of end caps 17a and 17b coupled to both ends of said casing 16, and two seals 18a and 18b mounted on the outside surfaces of each of said end caps 17a and 17b. Furthermore, grease nipple 19 for supplying grease to said balls 14 is attached to end cap 17a. As shown in FIGS. 4 and 5, each rolling element circulating path 12 is composed of load bearing track groove 12a and return path 12b, each formed linearly and mutually in parallel in both the left and right sides of casing 16, and a pair of roughly semi-circular direction changing paths 12c and 12d formed in both end caps 17a and 17b which connect said loading bearing track grooves 12a and return paths 12b at both of their ends. Furthermore, said load bearing track groove 12a is in opposition to track groove 11a of track rail 11.

The guide device having the constitution described above is, for example, arranged on a flat bed 22 equipped on a machine tool (the entirety of which is not shown) shown in FIGS. 4 and 5. Track rail 11 is fastened to said bed 22 by a plurality of bolts (with hexagon sockets) 23. Consequently, track rail 11 has flat mounting surface 11b for its bottom portion for mounting to bed 22. Furthermore, as shown in FIGS. 4 and 5, countersunk portions 11c, having a diameter larger than the head portions of said bolts 23, and insertion holes 11d, having a diameter slightly larger than the threaded portions of bolts 23, are concentrically formed in the bottom portion of track rail 11. Bolts 23 are screwed into bed 22 by being inserted into said countersunk portions 11c and insertion holes 11d so that they are completed embedded. In addition, as shown in FIG. 3, a plurality of threaded holes 16a are formed in the upper surface of casing 16 of sliding unit 13. Thus, a table supporting a workpiece and so forth (not shown) is fastened to said casing 16 by bolts (with hexagon sockets, not shown) screwed into these threaded holes 16a.

Next, the following provides a detailed description of the primary side and the secondary side of the direct current linear motor that are mutually guided by the guide device having the constitution described above.

As shown in FIGS. 3 and 5, said primary side has rectangular plate-shaped coil yoke 25 provided so as to extend over roughly the entire length of track rail 11 on said track rail, and a large number of excitation coils 26 arranged in a row on said coil yoke 25. Furthermore, coil yoke 25 is arranged near the bottom portion of track rail 11 having a cross-section formed roughly into the shape of the letter "U" opened upwards. More specifically, two support ledges 11e are formed in track rail 11 near its bottom portion. Coil yoke 25 is supported by these support ledges 11e, and are mounted to each of said support ledges with adhesive or small screws and so forth. In addition, as shown in the drawings, each of excitation coils 26 are wound into roughly rectangular shapes.

As shown in FIG. 5, electronic component group 28, including IC and transistors that compose a control drive circuit, is provided on the lower surface of coil yoke 25. Wiring for electrically connecting these electronic components to each other is done by means of etching and so forth into the upper surface of coil yoke 25. However, said wiring and coil yoke 25 are electrically insulated from each other. Namely, coil yoke 25 is composed to act as a circuit board.

In addition, thin plate 29, made of plastic and so forth, is mounted on the upper surface of each excitation coil 26 for fixing each excitation coil in position. Electromagnetic conversion elements 30, composed of Hall effect elements and so forth for detecting the relative positions of the primary side, having coil yoke 25 and excitation coils 26 and so forth, and the secondary side to be later described in detail, are attached to the lower surface of said plate 29. A large number of these electromagnetic conversion elements 30 are arranged at intervals of a prescribed pitch in the direction of relative movement of said primary side and secondary side so as to be positioned inside each of the above-mentioned excitation coils 26. In addition, these electromagnetic conversion elements 30 are connected to the control drive circuit containing electronic component group 28.

On the other hand, the secondary side is composed in the manner described below.

As shown in FIG. 5, said secondary side has magnet yoke 32, mounted on the lower surface of casing 16, a constituent member of sliding unit 13, and field magnet 33 mounted on the lower surface of said magnet yoke 32 to oppose each of excitation coils 26 on the above-mentioned primary side. As is clear from FIG. 6, field magnet 33 is formed overall into the shape of roughly rectangular plate, and a plurality of N and S magnetic poles, in this case 5 poles, are magnetized so as to be alternately arranged in a row along direction A of relative motion of the primary side and secondary side, or in other words, along the lengthwise direction of track rail 11.

The linear motion unit containing the direct current linear motor described above is used, for example, so that sliding unit 13 supports a table (not shown). In this constitution, a workpiece (not shown) is placed on said table and fixed in position. By supplying a prescribed current to excitation coils 16 with said workpiece in the state described above, thrust is produced between the primary side and the secondary side according to Fleming's right-hand rule causing the secondary side to move with respect to the primary side, or in other words, the stationary side, resulting in transport of said workpiece.

Figure 7:
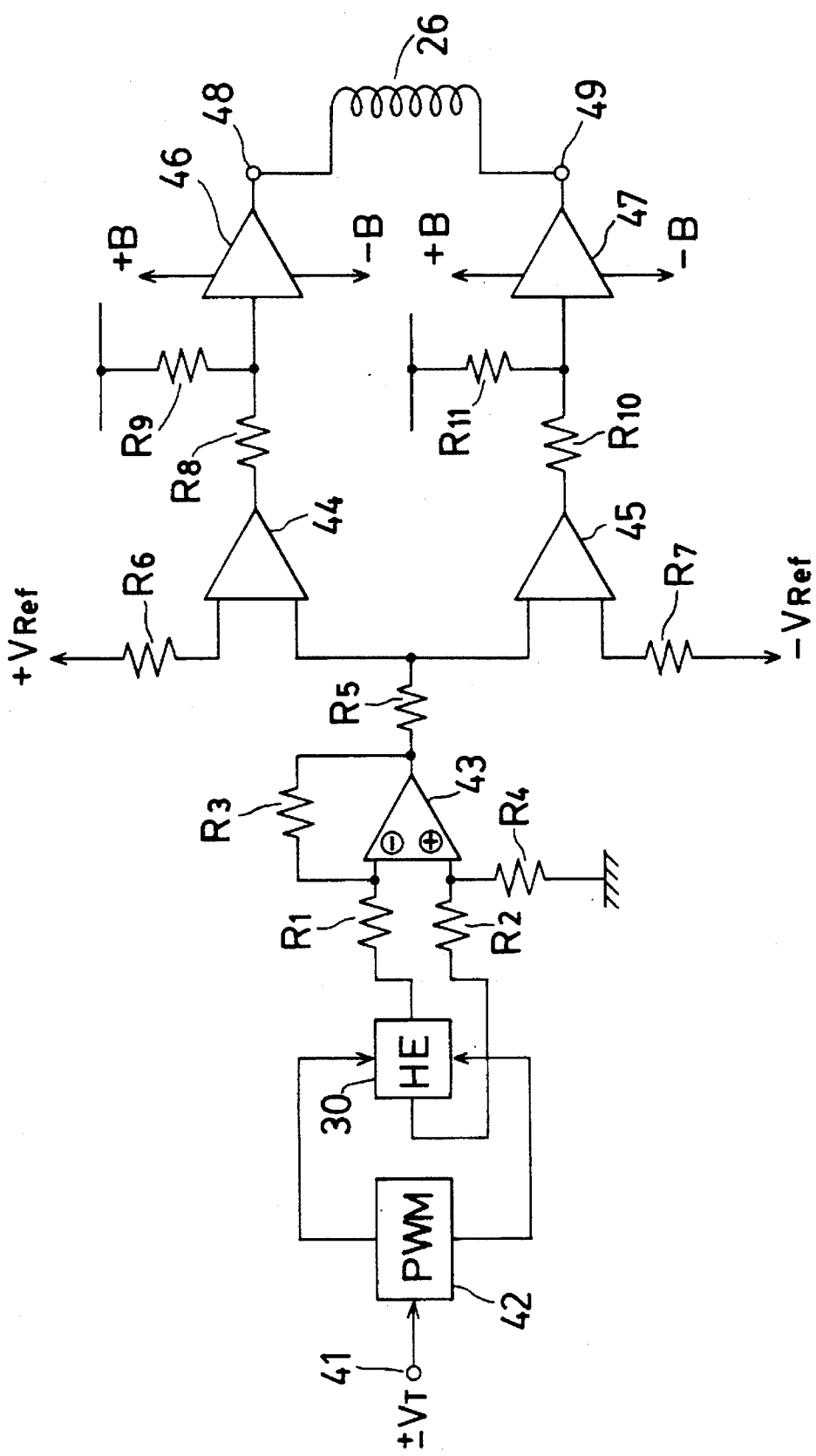
FIG. 7 is a circuit block drawing showing one embodiment of the direct current motor drive apparatus of the present invention.

FIG. 7 shows a block drawing of the drive apparatus claimed in the present invention for driving a direct current linear motor composed in the manner described above. Furthermore, FIG. 7 shows the circuit portion that supplies excitation current to one of the plurality of excitation coils. Since the drive circuit for the other excitation coils is identical to this, explanation is omitted.

In FIG. 7, 41 is an input terminal to which a torque command signal of $\pm V_T$ is supplied. The torque command signal of $\pm V_T$ is applied to a pulse modulation device in the form of pulse width modulator 42 from this input terminal 41. The output terminal of pulse width modulator 42 is connected to a controlled input terminal of an electromagnetic conversion element in the form of Hall effect element 30. The Hall effect output terminals of said Hall effect element 30 are connected to an inverted input terminal and non-inverted input terminal of operational amplifier 43 via input resistors R1 and R2, respectively. Return resistor R3 is connected between the output terminal of said operational amplifier 43 and said inverted input terminal, while ground resistor R4 is connected between the non-inverted input terminal of operating amplifier 43 and ground.

One end of output resistor R5 is connected to the output terminal of said operating amplifier 43, while the other end of output resistor R5 is connected to the input terminals of comparison devices in the form of a first comparator 44 and a second comparator 45, respectively. The reference voltage input terminal of said first comparator 44 is connected to a prescribed positive reference voltage $+V_{Ref}$ via resistor R6, while the reference voltage input terminal of said second comparator 45 is connected to a prescribed negative reference voltage $-V_{Ref}$ via resistor R7.

The output terminal of said first comparator 44 is connected to the input terminal of a first power amplifier 46 that composes a power amplification device via resistor R8, and a prescribed bias voltage is applied to the input terminal of first power amplifier 46 via pull-up resistor R9.

In addition, the output terminal of a second comparator 45 is connected to the input terminal of a second amplifier 47 that composes a power amplification device via resistor R10, and a prescribed bias voltage is applied to the input terminal of second power amplifier 47 via pull-up resistor R11.

Each of the terminals of excitation coils 26 are then connected between output terminal 48 of first power amplifier 46 and output terminal 49 of second power amplifier 47.

Figure 8:
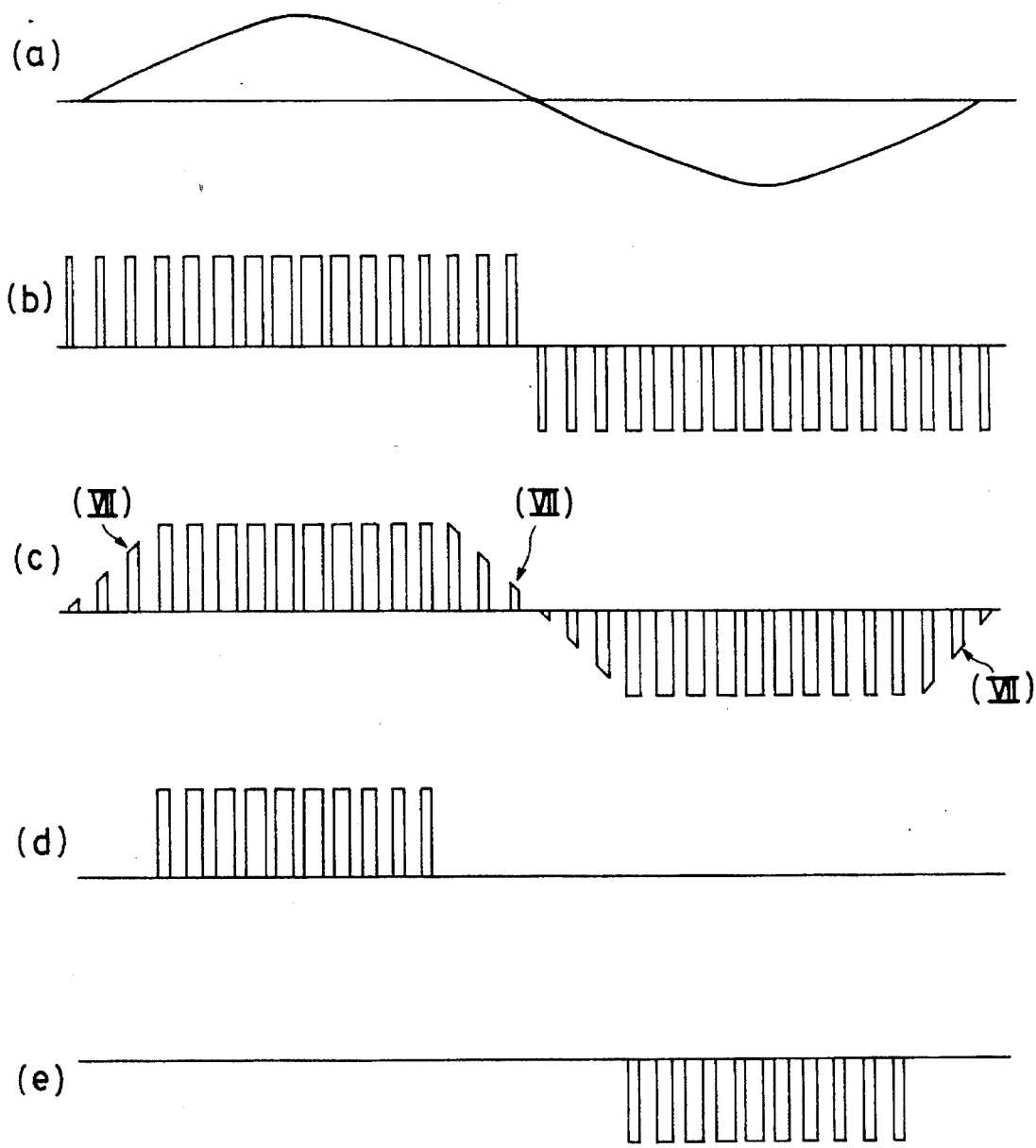
FIG. 8 is a signal waveform diagram showing the signal waveforms of each portion in the block drawing shown in FIG. 7.

In the constitution described above, when torque command signal of $\pm V_T$ is applied to input terminal 41 as shown in FIG. 8(a), pulse width modulator 42 generates a pulse width modulation signal like that shown in FIG. 8(b) corresponding to the voltage value of the torque command signal. This pulse width modulation signal is applied to a controlled input terminal of Hall effect element 30. At this time, Hall effect element 30 generates a pulse width modulation signal like that shown in FIG. 8(c) corresponding to the number of lines of magnetic force produced from field magnet 33 when field magnet 33 approaches the moving side.

This pulse width modulation signal shown in FIG. 8(c) is amplified by operating amplifier 43, and supplied to the respective input terminals of comparison devices in the form of first and second comparators 44 and 45. First comparator 44 generates an output when a pulse width modulation signal having a crest value that exceeds a prescribed positive reference voltage $+V_{Ref}$ is supplied.

Similarly, second comparator 45 generates an output when a pulse width modulation signal having a wave height value that is less than (or exceeds in the negative direction) a prescribed negative reference voltage $-V_{Ref}$ is supplied. Namely, a pulse width modulation signal in the positive direction, excluding the portion of the linear region (VII) generated by Hall effect element 30, is generated at the output terminal of first comparator 34 as shown in FIG. 8(d), while a pulse width modulation signal in the negative direction, excluding the portion of the linear region (VII) generated by Hall effect element 30, is generated at the output terminal of second comparator 45 as shown in FIG. 8(e).

These pulse width modulation signals shown in FIG. 8(d) and FIG. 8(e) are supplied to first power amplifier 46 and second power amplifier 47, respectively. Prescribed bias voltages are applied to the input terminals of said first power amplifier 46 and second power amplifier 47 via pull-up resistors R9 and R11. Thus, when the pulse width modulation signal shown in FIG. 8(d) arrives, first power amplifier 46 amplifies the power of this signal, and sends an excitation current to excitation coils 26. In addition, when the pulse width modulation signal shown in FIG. 8(e) arrives, second power amplifier 47 amplifies the power of this signal, and sends that excitation current to excitation coils 26.

The pulse width modulation signal of the portion of the linear region (VII) produced by said Hall effect element 30 is removed from the signal supplied to each of first and second power amplifiers 46 and 47 to allow understanding of the signal waveforms of FIG. 8(d) and FIG. 8(e). Thus, both power amplifiers 46 and 47 perform amplification operation in the region of roughly complete switching operation.

Consequently, there is little occurrence of collector loss of the power transistors that compose the power amplifiers, thus suppressing the generation of heat from the power amplifiers.

Figure 1:
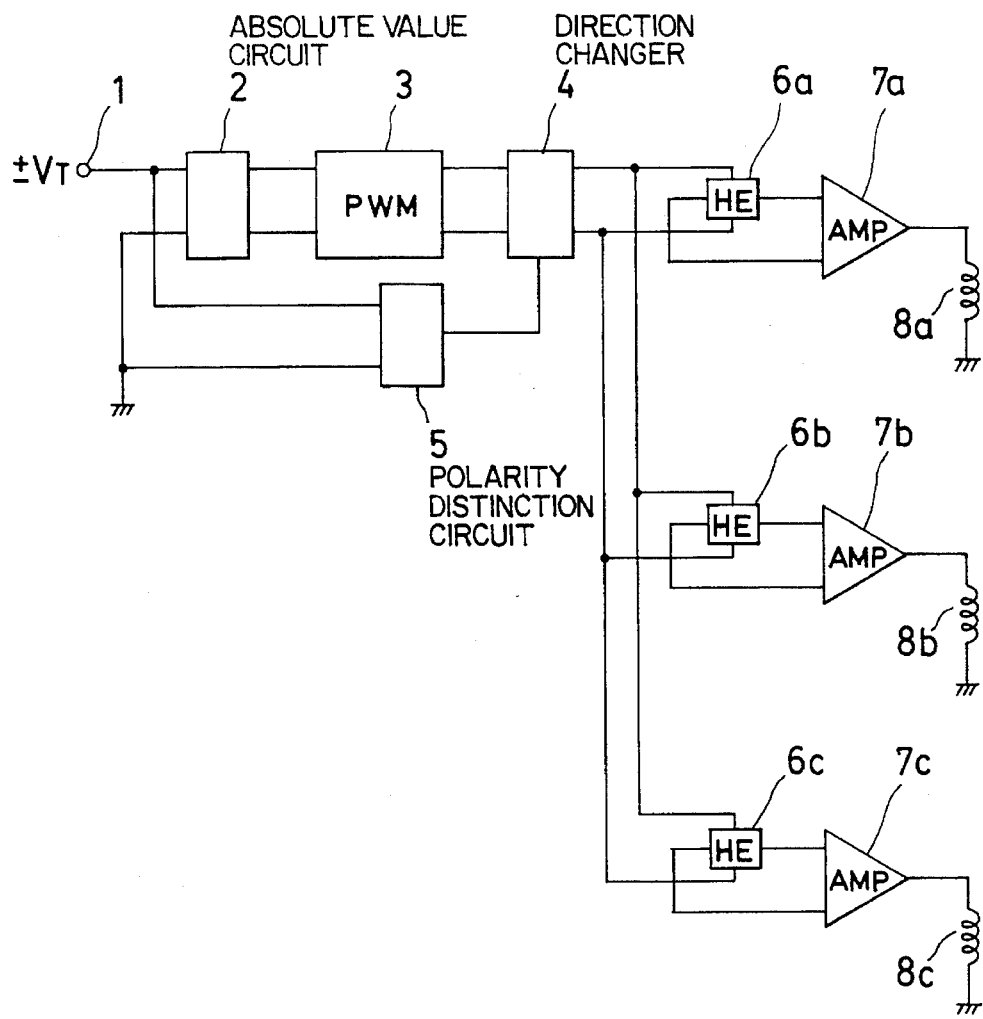
FIG. 1 is a circuit block drawing showing one example of a direct current motor drive apparatus of the related art.
Figure 2:
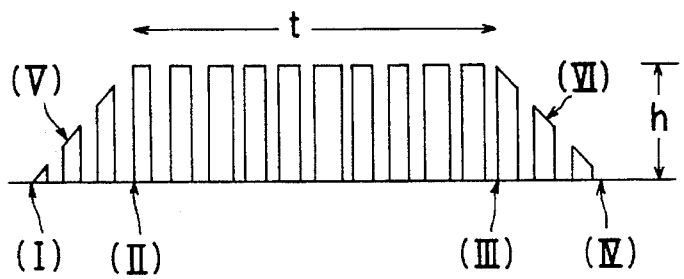
FIG. 2 is a signal waveform diagram showing a portion of the signal waveform in the block drawing shown in FIG. 1.

Furthermore, although the embodiment shown in FIG. 7 as explained above illustrates the case of employing a so-called push-pull constitution for the comparison devices and power amplification devices, this can also be applied in the case of a single constitution. For example, this can be realized in the example of the prior art shown in FIG. 1 by respectively inserting comparison devices, which perform waveform shaping of the output signals from each of the Hall effect elements 6a through 6c, between each of the Hall effect elements 6a through 6c and each of the power amplifiers 7a through 7c.

As is clear from the explanation provided above, according to the direct current motor drive apparatus claimed in the present invention, since a pulse width modulated drive signal, obtained from a Hall effect element, is supplied to a comparison device, and waveform shaping is performed by this comparison device to remove the signal of the linear region in the pulse width modulated drive signal, the power amplifier that receives this signal operates in a region of roughly complete switching.

Thus, there is little collector loss of the power transistors that compose the power amplifier, or in other words, generation of heat from each power amplifier can be suppressed, thereby offering the advantage of being able to provide a direct current motor drive apparatus of high reliability.

What is claimed is:

1. A direct current motor drive apparatus comprising:

a pulse modulation device that modulates a torque command signal into a corresponding pulse signal;

an electromagnetic conversion device for providing an output signal based on said pulse signal from said pulse modulation device;

a comparison device that compares the output signal of said electromagnetic conversion device to first and second reference voltages, said first voltage being more positive than said second voltage, and outputs a portion of the output signal which is either greater than said first voltage or less than said second voltage while preventing another portion of the output signal which is less than said first voltage and greater than said second voltage from being output; and a power amplification device that amplifies the portion of the output signal output by said comparison device and supplies the amplified output signal to an excitation coil.

2. A direct current motor drive apparatus as claimed in claim 1, wherein said pulse modulation device is a pulse width modulator which modulates a torque command signal to a pulse width, and said electromagnetic conversion device is a Hall effect element.

3. A direct current motor drive apparatus as claimed in claim 1, wherein said comparison device comprises:

a first comparator which compares the output signal to said first reference voltage and outputs the portion of the output signal which is greater than said first reference voltage; and a second comparator which compares the output signal to said second reference voltage and outputs the portion of the output signal which is less than said second reference voltage.

4. A direct current motor drive apparatus as claimed in claim 3, wherein said power amplification device comprises:

a first power amplifier which amplifies the portion of the output signal output by said first comparator; and a second power amplifier which amplifies the portion of the output signal output by said second comparator;

first and second terminals of said excitation coil being connected to output terminals of said first and second power amplifiers, respectively.

5. A direct current motor drive apparatus comprising:

a pulse modulation device that modulates a torque command signal into a corresponding pulse signal;

an electromagnetic conversion device for providing an output signal based on said pulse signal from said pulse modulation device;

a shaping device that receives and shapes the waveform of the output signal from the electromagnetic conversion device; and a power amplification device that amplifies the signal output by said shaping device and supplies the amplified output signal to an excitation coil.

6. A direct current motor drive apparatus as claimed in claim 5, wherein said pulse modulation device is a pulse width modulator which modulates a torque command signal to a pulse width, and said electromagnetic conversion device is a Hall effect element.

7. A direct current motor drive apparatus as claimed in claim 5, wherein said shaping device comprises:

a first comparator which compares the output signal to a first reference voltage and outputs a portion of the output signal which is greater than said first reference voltage; and a second comparator which compares the output signal to said second reference voltage and outputs a portion of the output signal which is less than said second reference voltage.

8. A direct current motor drive apparatus as claimed in claim 7, wherein said power amplification device comprises:

a first power amplifier which amplifies the portion of the output signal output by said first comparator; and a second power amplifier which amplifies the portion of the output signal output by said second comparator;

first and second terminals of said excitation coil being connected to output terminals of said first and second power amplifiers, respectively.

* * * * *